March 7, 1944. K. Y. TAYLOR 2,343,715
WRAPPER FOR HACK SAW BLADES
Filed Feb. 14, 1941
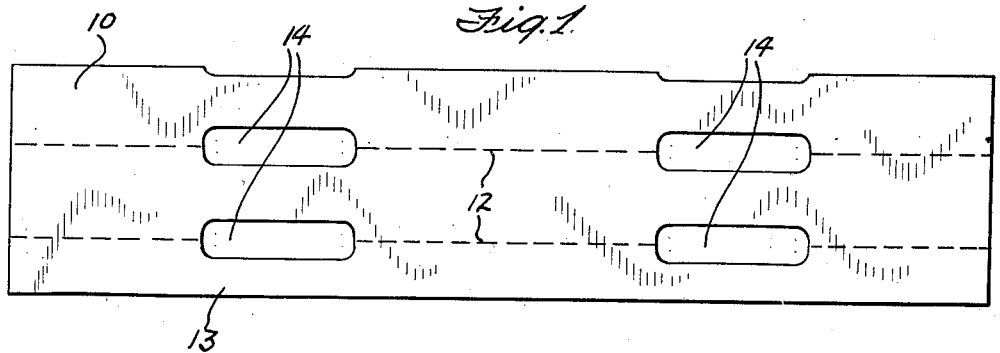
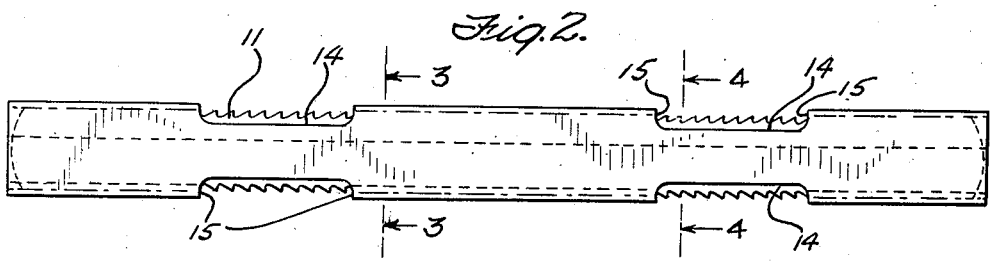
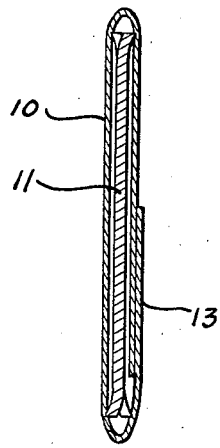 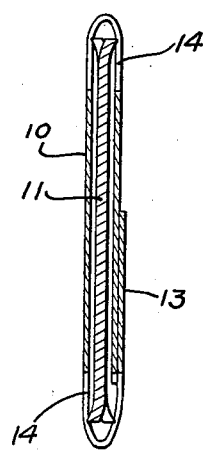
INVENTOR
KENYON YALE TAYLOR
BY
ATTORNEY Patented Mar. 7, 1944

2,343,715

UNITED STATES PATENT OFFICE 2,343,715

WRAPPER FOR HACK-SAW BLADES

Kenyon Yale Taylor, Shelburne, Mass., assignor to Millers Falls Company, Greenfield, Mass., a corporation of Massachusetts Application February 14, 1941, Serial No. 378,875

5 Claims. (Cl. 206—46)

This invention relates to wrappers for hack saw blades.

An object of the invention is to provide a wrapper for a hack saw blade which can be easily applied to the blade.

Another object of the invention is to provide a wrapper for a hack saw blade which will disclose portions of the blade including the teeth thereof, so that a purchaser can see what the wrapper contains without taking it off.

Another object of the invention is to provide a wrapper for a hack saw blade, as defined above, which will act as a protector for the exposed portion of the blade.

Another object of the invention is to provide a tubular open ended wrapper for a hack saw blade so designed that when once inserted, the blade will not readily slip out of it.

Other objects of the invention will in part be obvious and will in part appear hereinafter.

The invention accordingly comprises an article of manufacture possessing the features, properties, and the relation of elements which will be exemplified in the article hereinafter described, and the scope of the application of which will be indicated in the claims.

For a fuller understanding of the nature and objects of the invention reference should be had to the following detailed description taken in connection with the accompanying drawing, in which:

Fig. 1 is a development of the wrapper before folding into its finished form.

Fig. 2 is a side elevational view of my improved wrapper showing it applied to a double edged hack saw blade;

Fig. 3 is a sectional end view of the wrapper taken on the line 3—3 of Fig. 2; and Fig. 4 is a sectional end view taken on the line 4—4 of Fig. 2.

The wrapper of my invention comprises a sheet 10 of thin cardboard or heavy paper having a length substantially equal to the length of the saw blade 11 and a width sufficient to permit the sheet to be folded along the dotted lines 12, so that it passes around the blade once with a portion 13 overlapping so that the edges may be cemented together as clearly indicated in Figs. 3 and 4. Portions of the wrapper are cut away forming a plurality of openings 14 which lie along the fold lines 12 spaced from the ends and are of sufficient size to disclose the teeth of the blade, as clearly indicated in the drawing. The saw blade shown for purposes of illustration has cutting teeth on each edge of the blade, and I therefore provide cut-outs for each folded edge of the wrapper, as shown.

The wrapper is first folded into shape and the overlapping edge 13 is cemented over the other edge, leaving the ends of the wrapper open. The saw blade is then inserted through one end of the wrapper. It is prevented from slipping out again by the fold of the paper or cardboard over the teeth, which, because of the set therein, make the blade slightly thicker at the edges than at the center. The sharp side edges of the teeth cut into the wrapper as clearly indicated in Fig. 3, and prevent the blade from sliding longitudinally thereof. In addition, the edges 15 of the cut-outs also tend to catch the teeth of the blade if the blade should move longitudinally in the wrapper and thus forms an additional means to prevent the blade from sliding out.

The portions of the wrapper at each side of the cut-outs keep the teeth out of contact with surfaces which might damage them during shipment or storage.

From the above it will be seen that I have provided a simple wrapper for a hack saw blade into which the blade can easily be inserted through one of the open ends, but which readily discloses the character of the blade through the cut-outs on the edges thereof at the same time protecting the teeth at the exposed portions. It will also be evident that the blade, once inserted in the wrapper, will be prevented from slipping out easily by the action of the teeth against the inner surface of the wrapper.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which as a matter of language might be said to fall therebetween.

Having described my invention, what I claim as new and desire to secure by Letters Patent is:

1. In combination, a hack saw blade and a wrapper, said wrapper comprising a rectangular sheet of relatively stiff material, the side edges of which are folded over the body of the sheet in overlapping relation and cemented together to form a tubular envelope open at the ends, there being portions of said sheet cut out at the folds to form openings through which the teeth of the blade are visible, the width of the wrapper after folding being such that it will be held upon the saw blade by frictional contact with the teeth thereof.

2. In combination, a hack saw blade and a wrapper, said wrapper comprising a rectangular sheet of relatively stiff material having the side edges folded over against the body of the sheet in overlapping relation and cemented together, there being openings in the sheet with at least one opening on each fold line, whereby portions of both edges of the saw blade are visible through the wrapper, the width of the wrapper after folding being such that it will be held upon the saw blade by frictional contact with the teeth thereof.

3. In combination, a hack saw blade and a wrapper, said wrapper comprising a tubular envelope of relatively stiff material, open at both ends, and of such dimensions as to cause the inner walls of said envelope to engage the side edges of some of the teeth on a hack saw blade when said saw blade is inserted in said envelope.

4. In combination, a hack saw blade and a wrapper, said wrapper comprising a tubular envelope of relatively stiff material, open at both ends, and of such dimensions as to cause the inner walls of said envelope to engage the side edges of some of the teeth on a hack saw blade when said saw blade is inserted in said envelope, there being at least one opening in said envelope to disclose a portion of the teeth through said envelope.

5. In combination, a hack saw blade and a wrapper, said wrapper comprising a tubular envelope of relatively stiff material, open at both ends, and of such dimensions as to cause the inner walls of said envelope to engage the side edges of some of the teeth on a hack saw blade when said saw blade is inserted in said envelope, said envelope being cut to form a shoulder adapted to engage certain other of said teeth when said saw blade is moved longitudinally of said envelope.

KENYON YALE TAYLOR.